US010023790B1

(12) United States Patent
(10) Patent No.: US 10,023,790 B1
(45) Date of Patent: Jul. 17, 2018

Zielke et al.

(54) DUST FREE PROPPANT AND METHOD OF MAKING SAME

(71) Applicant: Unimin Corporation, New Canaan, CT (US)

(72) Inventors: Richard C. Zielke, The Woodlands, TX (US); Feipeng P. Liu, Arden, NC (US)

(73) Assignee: Covia Holdings Corporation, Independence, OH (US)

( * ) Notice: Subject to any disclaimer, the term of this patent is extended or adjusted under 35 U.S.C. 154(b) by 0 days.

(21) Appl. No.: 15/091,034

(22) Filed: Apr. 5, 2016

Related U.S. Application Data

(60) Provisional application No. 62/168,358, filed on May 29, 2015, provisional application No. 62/170,489, filed on Jun. 3, 2015.

(51) Int. Cl.
*C09K 8/80* (2006.01)
*B05D 1/36* (2006.01)
*B05D 1/02* (2006.01)

(52) U.S. Cl.
CPC .................................... *C09K 8/805* (2013.01)

(58) Field of Classification Search
None
See application file for complete search history.

(56) References Cited

U.S. PATENT DOCUMENTS

2006/0148928 A1* 7/2006 Harris ........................ F17D 1/17
523/175
2013/0192835 A1 8/2013 Vorderbruggen et al.
2013/0233545 A1* 9/2013 Mahoney ................. C09K 8/80
166/280.2
2015/0104647 A1 4/2015 Bestaoui-Spurr et al.
2015/0119301 A1* 4/2015 McDaniel .............. C09K 8/805
507/224

* cited by examiner

*Primary Examiner* — John J Figueroa
(74) *Attorney, Agent, or Firm* — Rankin, Hill & Clark LLP

(57) ABSTRACT

A long term dust free proppant comprising a mass of free flowing particles, where the particles are coated with a dust suppression solution containing 90 to 99.5 percent by weight water, 0.05 to 3.0 percent by weight a soluble polymer and an added, small amount of a surfactant. The mass has a very low dosage of the solution so the mass has a moisture content of less than 0.30 percent by weight. Preferably the solution is applied to the particles by an air mist jet.

7 Claims, 5 Drawing Sheets

DUST FREE PROPPANT AND METHOD OF MAKING SAME

This application claims priority in provisional patent application Ser. No. 62/168,358 that was filed on May 29, 2015 and in provisional patent application Ser. No. 62/170,489 that was filed on Jun. 3, 2015, which are both incorporated by reference herein.

The present invention relates to an improvement in a proppant, specifically frac sand, used in hydraulic fracking and more particularly to a novel proppant that is modified to be dust free for a long period of time, i.e. at least 4 days. Thus, the new proppant is a "long term dust free" proppant.

INCORPORATION BY REFERENCE

The invention of this application relates to a dust free proppant. US Publication 2015/0119301 discloses on method of coating a proppant with a solution and is incorporated by reference to form a part of the specification of this application. It is hereafter referred to as "McDaniel".

BACKGROUND OF INVENTION

Dust control of frac sand by applying a solution of water and polymers, such as cationic polymers, is disclosed in recently published applications by Baker Hughes (2013/0192835) and (2015/0104647). Applying dust control solutions onto the surface area of the sand is a well-known technology. These patent documents are incorporated by reference herein. Lab test showed that the Baker Hughes technologies were not effective to keep the measured average dust concentration of treated materials in airborne environment less than 0.05 milligrams per cubic meters, especially, the dust suppression effectiveness is temporary and short-life with less than four days, often if at all, for not more than a day or so. Such short time dust control is unacceptable in the hydraulic fracing field. In general, at least two to three days are required to make sure that the treated frac sand still has the needed potent of dust suppression efficiency. In addition, a re-drying operation in most dust suppression operation is needed in order to effectively flow the chemically treated frac sand. Without a re-drying operation, the frac sand will create operational issues such as arching, adjacent particles sticking to each other. As such, a chemical solution is needed to have a prolonged dust suppression efficiency held for at least four days and have a dust free frac sand product with an average dust concentration of less than 0.05 milligrams per cubic meter without a need for re-drying while still maintains its flow free characteristics during transportation and at hydraulic fracing onsite operation, i.e. a moisture content of less than 0.30 percent. There is a need for a "long term dust free" proppant.

DEVELOPMENT

In response to the above industry demand, proppant, specifically dust free frac sand, was developed with the disclosed new technologies present herein. The dust free proppant will have an average measured dust concentration less than 0.10 (mg/m$^3$), more preferred less than 0.05 (mg/m$^3$), i.e. it is "dust free" and will maintain a low dust concentration for at least 4 days, thus, it is "long term dust free".

STATEMENTS OF INVENTION

A new frac sand (proppant) has been developed, which proppant has an average dust concentration preferably less than 0.05 milligrams per cubic meter and a moisture content of the frac sand of less than 0.3 percent. The newly developed frac sand retains an average dust concentration of less than 0.05 milligrams per cubic meter for at least 4 days. This is the definition of a "long term dust free" proppant. Preferably the term is more than 4 days.

The dust free frac sand (proppant), as defined above, is produced by coating the frac sand with a new dust control solution. This newly developed solution contains at least 90 percent water (preferably at least 97 percent water) and one or more water soluble polymers, preferably cationic, that will react with the frac sand to limit dust, where the solution dosage is in the preferred range of 0.8 to 1.2 mL/lbs. The new solution includes an added small amount of surfactant to increase dust control and/or prolong the low dust concentration by the solution for at least about 4 days. The addition of a small amount of surfactant converts a known solution of polymers, preferably cationic polymers, into a novel solution.

In the new dust free frac sand, as described above, the "small amount" of surfactant in the solution is preferably less than 0.10 percent, less than 0.05 percent and, more preferably, less than 0.03 percent. This is the definition of "added small amount" in Table 1.

The solution for making the new dust free frac sand, as described above, preferably includes polymer or polymers that are thermoset, thermoplastic, or elastomeric polymers, typically polymers including, but not limited to, polyvinyl alcohol (PVOH), polyacrylamide polymers, etc. The polymers may be categorized as ionic, cationic, or non-ionic, but in the preferred and practical embodiment they are cationic polymers.

In the new dust free frac sand, as described above, the solution is preferably sprayed on the frac sand as it falls at room temperature. Room temperature less than 60° C. and preferably less than 30° C. A preferred aspect of the invention is using an air mist for the spraying operation to evenly spread the new solution over the surfaces of the proppant.

The new dust control solution with a small amount of surfactant is preferably sprayed onto the frac sand in one or more sprayed layers, but preferably in a single layer.

The dust free frac sand, as described above, can use more than one, preferably cationic polymer, where the multiple polymers are combined into one novel solution. Indeed, in the preferred embodiment, the new chemical solution contains cationic polymers, an electrolyte and solvent (water) as shown in Table 1.

Other polymers are applicable if they have the dust control characteristics that meet the product performance criteria defined in the broad aspect of this invention.

In summary, the discovery is (a) an improved frac sand (proppant) and (b) such a frac sand has a very low dosage of a dust control solution having at least 90 percent water and preferably at least about 95 percent water and one or more water soluble, preferably cationic, polymers to attract dust on the surface of the frac sand wherein the action of the polymers and the associated water in dust control is modified by adding a small amount of surfactant. Surfactants have never been used with such known dust control solutions of cationic polymers sprayed or dipped onto the particles of the proppant.

These and other aspects and features of the invention will become apparent to those skilled in the art upon a reading of the description of the invention set forth below taken together with the drawing which will be described in the next section.

BRIEF DESCRIPTION OF THE DRAWINGS

The invention is described herein using the following drawings, where.

DESCRIPTION OF METHODS

Figure 1:
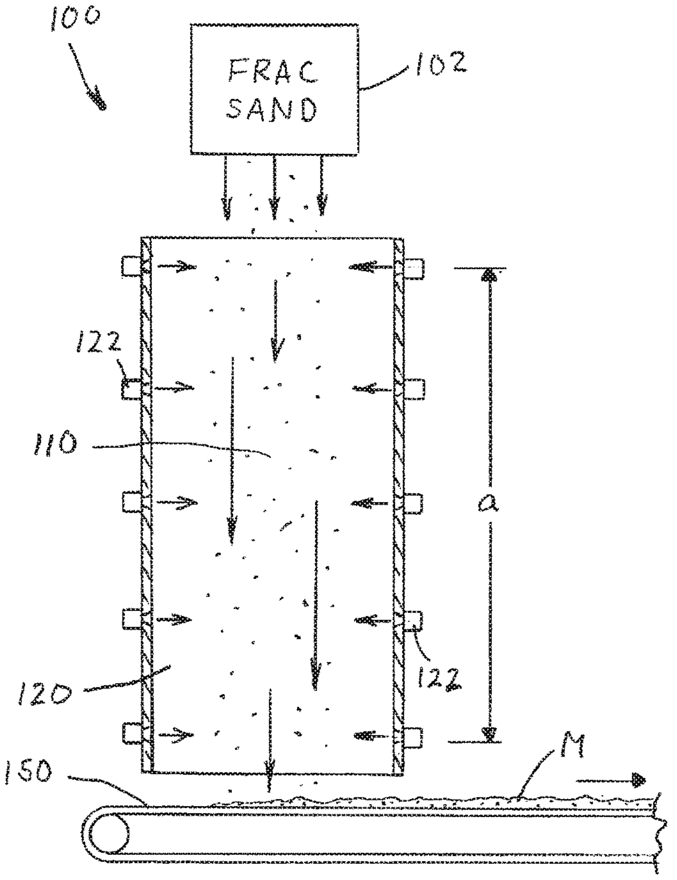
FIG. 1 is a schematic layout of a spraying system for applying the novel solution of the present invention.
Figure 2:
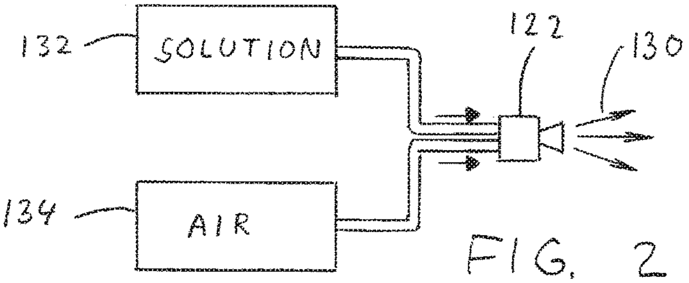
FIG. 2 is a schematic layout of the novel air spray nozzles to for an air mist used in the system of FIG. 1.

As indicated above, the invention involves a new dust suppression solution for coating the surfaces of the granular particles of a proppant, like frac sand. Coating of proppants with dust suppression solutions is well known in the proppant industry. Like prior solutions, the new solution is coated on by various methods, such as shown in FIGS. 1-4. One of such methods is method 100 shown in FIGS. 1 and 2, frac sand having a selected particle size of 100-3,000 at supply 102 is passed downwardly as steam 110 through a chamber 120, such as a circular chamber, having surrounding jets 122. Length a is the distance the falling particles are subjected to the air mist so the correct amount of solution is coated on the particles. Jets 122 spray the particles with the novel solution as an air mist 130 comprising the new solution in supply 132 with propelling air from supply 134 to forcibly spread the solution over the particles. After the particles in stream 110, which are free flowing and free falling, are coated evenly with the new solution, the proppant remains free flowing, i.e. a moisture content after adding the solution is still less than 0.30 percent, and preferably less than 0.10 percent. Mass M of proppant particles is collected on a transport device, shown as belt conveyor 150, for storage and shipment to the hydraulic fracking site. Method 100 is performed at room or ambient temperature to retain the integrity of the chemicals coated onto the proppant particles and can be modified as shown in the McDaniel prior art, which publication uses a solution spray, but not the preferred novel air mist, as shown in FIG. 2.

Figure 3:
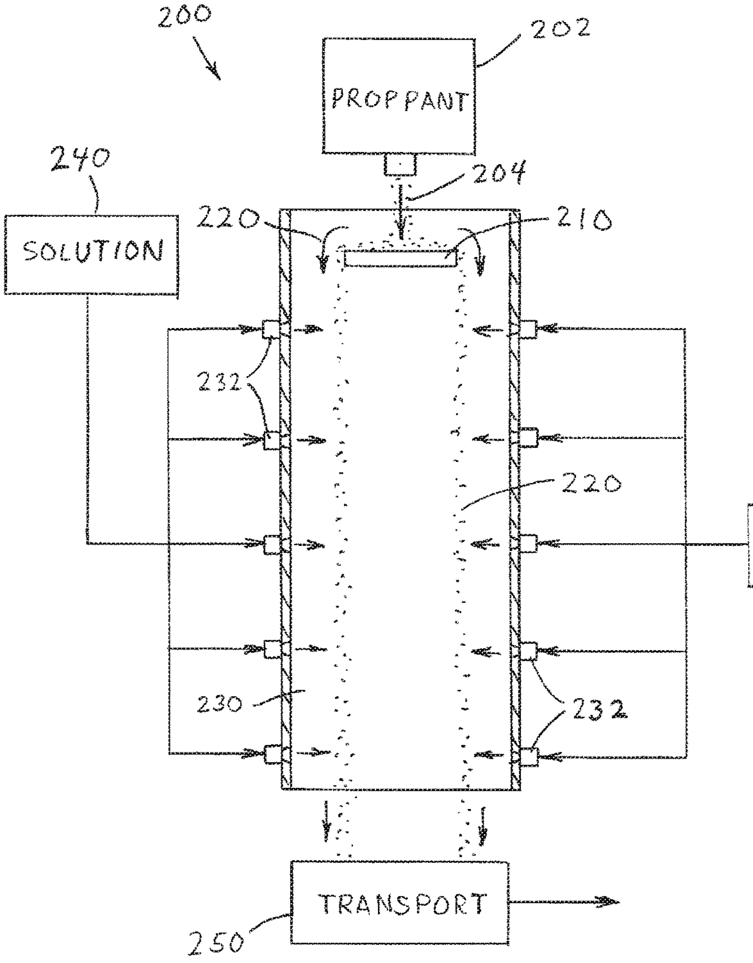
FIG. 3 is a schematic layout of a modified spraying system for applying the novel solution of the present invention.
Figure 4:
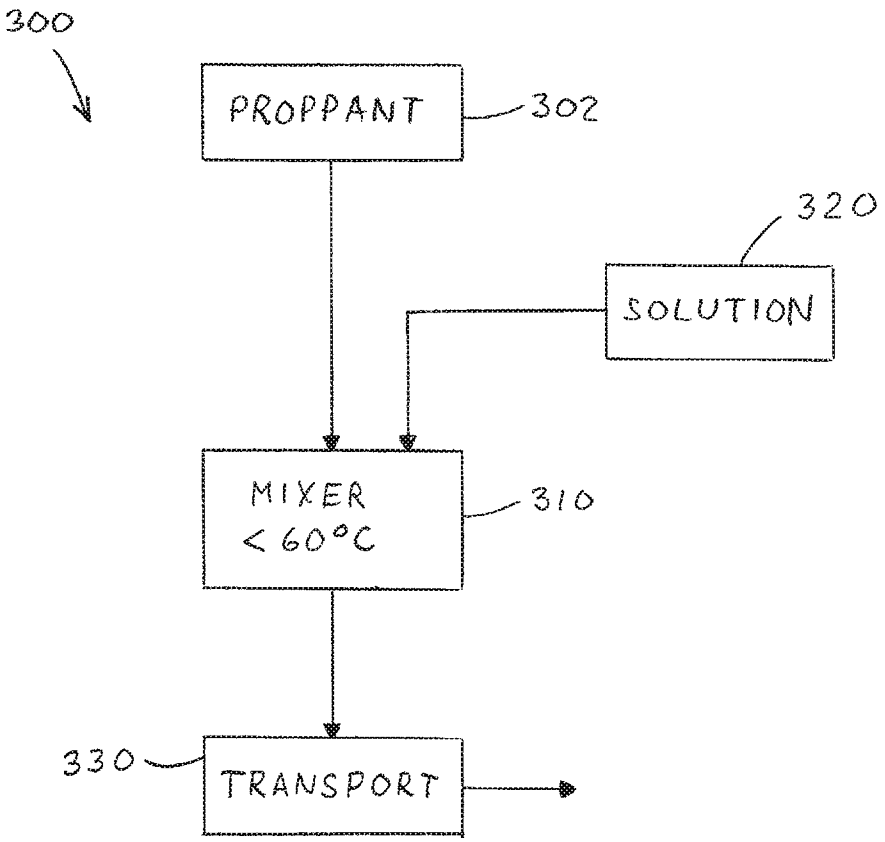
FIG. 4 is a schematic layout of a system for mixing the novel solution with the proppant particles to produce the novel long term dust free proppant.

Another method for coating particles with the new solution is method 200 shown in FIG. 3. A standard, free flowing (i.e. dry) proppant in supply 202 is directed by a stream 204 onto deadbed plate 210 where stream 204 is accumulated and spread into a hollow stream 220 falling downwardly through chamber 230 having solution jets 232 for directing the new solution from one or more supplies 240, like jets 122 in method 100. The jets preferably use air to carry the solution to the falling particles. Coated particles are collected by transport equipment 250 for storage and/or shipment to the fracking site.

It is apparent that the new solution can be applied by any coating method now known or later developed. Another such method is method 300 disclosed in FIG. 4. A mass of free flowing proppant particles in supply 302 is conveyed to a mixer 310 where it is combined with a quantity of new dust suppression solution from supply 320. The amount of new solution is such that the moisture content of the proppant remains less than 0.30 percent; consequently, as in the other methods, the amount of new solution is controlled to coat the particles. By using a small amount of surfactant, generally complete coating is obtained without causing the proppant to lose its free flowing characteristic. This is not true of solutions without the discovered invention of the "new" solution. After the mass of proppant and controlled amount of solution has been mixed to coat the particles, the coated particles as transferred from mixer 310 to transport equipment 330 for storage and/or shipment to the fracking site.

Mixer 310 of method 300 has a temperature notation for the purpose of indicating that the coating method for the new solution should not increase the temperature of the proppant to a temperature that evaporates any of the controlled water content. Such reduction in the combined water content by increased heat to a high level affects even prior coating solutions. In practice, the coating methods 100, 200 and 300 are performed at room or ambient temperature in the general range of −20 to 60 degrees per Centigrade and preferably in the general range of 5-30 degrees Centigrade.

The above processes for preparing the long term dust free proppant is possible by discovery of a new dust suppression chemical solution with surprising, novel characteristics. In method 200, the novel solution is sprayed as an airborne mist to fall frac sand in a chamber 220 with impact plate 210. The airborne dust components in the frac sand are deflected by impact plate 210 and are effectively knocked down by coating with the new chemical solution. Alternatively, the new chemical solution can be coated with a mixer or blender 310 or sprayed on the frac sand vertically or horizontally in a chamber 120. The dosage levels of sprayed chemicals on frac sand are in a range from 0.01 (mL/lbs) to 10 (mL/lbs), preferred from 0.05 mL/lbs to 5.0 (mL/lbs), more preferred 0.8 to 1.2 (mL/lbs). The preferred new chemical solution in methods 100, 200 and 300 is comprised of multi-components by weight percentages, as listed in Table 1 where a known dust suppression solution items 1-4 has an "added, small amount" of a surfactant, item 5. In the preferred examples, the surfactant is anionic NP7 while the polymers are cationic. However, nonionic L61 has been used.

TABLE 1

Solution chemical composition for blending and spraying

| | Components | Range by wt. % |
|---|---|---|
| 1 | Water | 90-99.5 |
| 2 | Electrolyte (sodium chloride) | 0.01 to 0.4 |
| 3 | Cationic polymer 1 | 0.05-3.0 |
| 4 | Cationic Polymer 2 | 0.05-3.0 |
| 5 | Surfactant (anionic, ionic, non-ionic, amphoteric, etc.) | 0.0001 to 0.50 |

The invention relates to an improvement in a granular proppant, which invention makes the proppant "dust free" when the same solution without the "added" surfactant was not successful in the proppant industry. The new proppant remains dust free (less than 0.05 mg/m$^3$) for at least 4 days, i.e. it is a "long term dust free" proppant. The development work has been performed on frac sand with its known dust emitting properties. The invention is defined broadly as "frac sand" and is disclosed as a frac sand; however, this term "frac sand", as it relates to the invention, not only includes actual frac sand as discussed herein, but also includes other granular proppant materials having the type of dust problems experienced by frac sand, such as bauxite.

The advantages of the developed, improved dust free proppant i.e. "frac sand" include: 1) The products will reduce the airborne dust concentration of chemically treated frac sand by as much as 99.9%, i.e. less than 0.10 milligrams per cubic meter and preferably less than 0.05 milligrams per cubic meter. 2) The dust suppression efficiency of chemically treated frac sand remains effective for at least 4 days making it a "long term dust free" proppant. 3) The products have better crush k values. 4) The products have less fine migration under downhole condition. 5) After being added with dust suppression solution chemicals, the products still remain to be a free flow body of granular "frac sand", with a moisture content less than 0.30 percent.

General Discussion

Frac sand coated with previous dust suppression chemicals, i.e. background solutions of items 1-4 of Table 1, had a very short life of dust suppression as shown in Table 2 using the background solution of Table 3.

TABLE 2

Summary of Average Dust Concentration

| Sample ID | Date (M:D:Y) | Storage Time (Days) | Ave. Conc. ($mg/m^3$) | % Reduction % |
|---|---|---|---|---|
| 186-039-005 | Sep. 25, 2014 | 0 | 0.0382 | 96.5 |
| 186-039-007 | Sep. 25, 2014 | 0 | 0.0474 | 95.7 |
| 186-039-005 | Sep. 26, 2014 | 1 | 0.11 | 90.0 |
| 186-039-007 | Sep. 26, 2014 | 1 | 0.101 | 90.8 |
| 186-039-007 | Sep. 29, 2014 | 4 | 0.423 | 61.6 |
| 186-039-005 | Sep. 29, 2014 | 4 | 0.612 | 44.5 |
| 186-039-007 | Sep. 30, 2014 | 5 | 0.3924 | 64.4 |
| 100 Roff Sands (ctrl.) | Sep. 30, 2014 | 5 | 1.102 | 0.0 |

It was discovered that the new dust suppression solutions meeting the ranges of Table 1 (having an "added small amount" of surfactant) will provide excellent dust suppression efficiency for at least 4 days. The novel solution tends to knock down the fines and respirable dust particles very effectively when the solution coating is sprayed with common spraying devices, as in methods 100 and 200. The fines in the proppant particles tend to migrate themselves from surface to pockets or channels and fix themselves inside the frac sand's pockets without generating more dust. When using the preferred new solution disclosed in Table 1, the measured overall average dust concentration of the proppant over 20 (min.) has relative exposure limit (REL) of no more than 0.05 ($mg/m^3$) determined by a pDR monitoring system with an in-house measurement system. Since the new solution is different from other types of dust suppression additives and chemicals, the developed recipes of the new solution have excellent downhole compatibility with fluid chemicals. The surface modified frac sand can increase the frac sand's crush k value without generating issues such as arching, caking, and bridging.

A proppant coated with the "new solution" meeting the definition of Table 1 with or without two polymers is the preferred embodiment of the invention.

Dust Concentration

A sealed frac sand dust test chamber was developed in house to determine the overall average dust concentration of frac sand. The procedures for testing the dust concentration of a proppant include that 2 (lbs.) of raw frac sand is filled into a plastic funnel on the top of a 10 ft. plastic pipeline. The charged frac sand falls freely along the pipeline. Once the frac sand hits the surface of a metal plate, they are dispersed and spread out in a fan shape pattern away from the metal plate. The plate has 60 (degree) of tilt angles to facilitate the frac sand's spreadout. Granular materials, such as airborne dust of respirable silica in the frac sand and/or chemically treated frac sand, are suspended in the sealed chamber and slowly settled on the bottom wall of test chamber. A dust concentration monitoring system called personal data ram (pDR) was installed inside one of the corners of the test chamber to acquire the real-time dust concentration data. The measured overall dust concentration over 20 (min.) was used as a key response variable to determine the effectiveness of dust suppression of a treated proppant.

EXPLANATORY EXAMPLES

To describe the development of a frac sand meeting the sought after dust concentration levels, background Examples were conducted and are explained hereafter.

Example 1

Two (lbs) of regular 100 mesh frac sand from Unimin's frac sand plant was charged in the in-house dust concentration test chamber per test and dust concentration of the test sample was determined by pDR. The measured overall average dust concentration was 1.362 ($mg/m^3$) in the 1$^{st}$ day, 1.487 ($mg/m^3$) in the 4$^{th}$ day, and 1.02 ($mg/m^3$) in the 8$^{th}$ day. This example explains the unacceptable dust levels experienced by frac sand proppants. The frac sand has "dust problems" as discussed herein.

Example 2

A regular cationic polymer solution for dust suppression treatment to frac sand with a solution concentration of 0.93% was prepared in a 1000 mL beaker with a solution recipe and procedure as listed in Table 3. This is the background solution. It has the components of Table 1, items 1-4 without the discovery on the present invention, i.e. the added small amount of surfactant item 5.

To prepare for the solution chemicals, 483.8 (gram) of di-water was measured into 1000 mL of glass beaker. Then, 1.0 (gram) of sodium chloride manufactured by Morton Salts, 12.2 (g) of Floquat FL 4135 solution, a cationic polymer manufactured by SNF Inc., and 19.3 (gram) of Kern Sep C-9014, a cationic polymer, manufactured by Kemira, were blended into the 1000 mL beaker. All beakers containing the residual cationic polymer solutions were rinsed with Di-water. Finally, the total weight of the whole blended mixture was added to 1000 (gram). The obtained final solution was transferred to a 1000 mL of plastic jar for later usage.

To treat the 100 mesh frac sand chemically, the 100 mesh frac sand was first conditioned at a target temperature of 19° C. (room temperature). Then, 8 lbs of 100 mesh pre-heated sands was transferred to a planetary mixer for the reagent application and mix. About 8.4 mL/lbs chemical additive solution was injected dropwisely into the batch mixer with a 30 mL plastic syringe at a fixed mixing time. The coated particles showed a lot of moisture and frac sand grains were very wet. Then, the excessive moisture was evaporated before the resin/polymer coated sand was packed in plastic bags. The frac sand using the Table 3 solution was processed as explained in Example 4 and is used to give Example 4 curve in FIG. 7. This frac sand using the prior cationic polymer solution did not meet the objectives of the development program.

TABLE 3

Regular Chemical Solution (Coating) for the Dust Suppression Frac Sand Treatment A) Raw Material Composition

| | Components | Wt (%) | Solution Conc. (wt. %) | Solid % | Quantities |
|---|---|---|---|---|---|
| 1 | Di-water (1/2) | 48.375 | | | 483.8 |
| 2 | Sodium Chloride | 0.097 | | 0.097 | 1.0 |
| 3 | Froquat FL 4135 | 1.219 | 35 | 0.429 | 12.2 |
| 4 | kern Sep C-9014 | 1.934 | 21 | 0.402 | 19.3 |
| 5 | Di-water (1/2) | 48.375 | | | 483.8 |
| | Total: | 100 | | 0.928 | 1000 |

B) Procedures for Preparing The Solution

| | |
|---|---|
| a | Weigh about 400 (gram) of Di-water into 1000 (mL) beaker |
| b | Wegith (2) into 100 mL of beaker and transfer (2) into (1) with rinsing Di-water |
| c | Weigh (3) and (4) into 100 mL of beaker blended together for 30 (second) |
| d | Transfer (6) and (7) into the 1000 mL beaker. |
| e | Rinse the emptied 100 mL beaker contained the solution multi-times |
| f | Fill the 1000 mL beaker with Di-water (5) until the total Wt. of Prepared solution having a total wt. 1000 (g) |
| g | Transfer solution into a 1000 mL plastic jar for late usage. |

C). Coat the Frac Sands with Solution Coatings

| | Components | Ratio (%) | Actual Quantities |
|---|---|---|---|
| 6 | 100 Mesh Frac Sands | 1 (lbs) | 8 (lbs) |
| 7 | Chemical Solution (A) | 8.4 mL | 67.2 (mL) |

D). Procedures/Step

| | |
|---|---|
| a' | Pre-heating (6) to a target sand temperature within 24 hr. overnight. |
| b' | Charge (6) into a planetory mixer (Hobart mixer) |
| c' | Turn the switch on of the plenatory mixer and allow the mixer to rotate at a fixed RPM |
| d' | Add (7) into the rotated (6) dropwisely using a plastic syring within 3 (min.) |
| e' | Blend the mixed component for a targeted time in the mixer |
| f' | Transfer the blended materials to a ziplock plastic bag and seal it for later use. |

Example 3

A new solution was prepared by adding to the unsuccessful Example 2 cationic polymer solution a small amount of commercially available anionic surfactant Tergitol NP-7. The raw material composition of the new Example 3 solution recipe is listed in Table 4. This is an embodiment of the "new" solution defined by the chemicals and ranges of Table 1. Items 1-4 are the unsuccessful Example prior cationic polymer solution. The new added small amount of surfactant is item 5.

TABLE 4

Dust Suppression Solutions used for Treating Frac Sands (example 3)

| Raw Material Components | Wt % | Wt % | Solution Conc. (%) | Solid % | Quantities (gram) |
|---|---|---|---|---|---|
| 1 Di-water | Di-water | 97.84 | | | 978.4 |
| 2 NaCl (Morton Salts) | NaCl (Morton Salts) | 0.1 | | 0.1 | 1.0 |
| 3 Floquat FL 4135 | Floquat FL 4135 | 1.12 | 35 | 0.392 | 11.2 |
| 4 Floquat FL 4440 | Floquat FL 4440 | 0.93 | 42 | 0.391 | 9.3 |
| 5 Tergitol NP-7 | Tergitol NP-7 | 0.01 | 100 | 0.01 | 0.1 |
| Total: | | 100 | | 0.893 | 1000.0 |

Both Floquat FL 4135 and 4440 are cationic polymers and were manufactured by SNF Inc. Tergitol NP-7 is an anionic surfactant manufactured by DOW chemicals and constitutes the improvement of the present invention. Sodium chloride solid was manufactured by Morton Salts with culinary grade of salts. The chemical solutions from background solution of Example 2 and new solution of Example 3 were both used to treat the same frac sand to make comparison on their dust suppression effectiveness as reported and illustrated in FIG. 7.

Example 4

Proppant was coated with background solution of Example 2. This involved 100 Mesh frac sand from Unimin's frac sand plant being chemically treated at room temperature≈19 (° C.) with background dust suppression solution disclosed in Example 2. In the treatment procedure, 16 (lbs) of frac sand was coated with solution chemicals prepared with Example 2 recipe at a dosage level of 0.84 (mL/lbs) by a spraying operation. The frac sand was chemically treated with solution chemical described in Table 3. The sprayed coatings were conducted in a sealed chamber, in which, about 16 (lbs) of the above 100 mesh frac sand was dropped through an orifice hole with a ¾" of diameters from about 10 feet above the ground through a transparent plastic pipeline. The plastic pipeline has a diameter about 3" and the frac sand will fall on a metal plate installed in the test chamber. A spraying gun installed on the side wall of the sealed chamber was used to spray the solution chemicals with a fan shape pattern in a manner similar to method 200. Dosage level of sprayed solution chemicals is controlled and calculated by the flow rate of sprayed chemical solutions and flow rate of dropped frac sand. The overall dust concentration of the chemically treated frac sands using the background solution of Table 3 was monitored with in house dust monitoring system of pDR measurement immediately, and at $1^{st}$ day, $3^{rd}$ day, 4 days, and 10 days. The values of the average dust concentration for these samples are 0.033 ($mg/m^3$) (0 day), 0.135 ($1^{st}$ day), 0.579 ($3^{rd}$ day), 0.579 ($4^{th}$ day), and 0.386 ($10^{th}$ day). This frac sand is the Example 4 curve of FIG. 7.

Example 5

In this example, 100 Mesh frac sand from Unimin's frac sand was first pre-heated at a target temperature of 120° C. overnight, then, the heated sample chemically treated with dust suppression solutions originally from Example 2 (Table 3) recipe at a dosage level of 0.84 (mL/lbs) through spraying procedure described in Example 4. The measured overall average dust concentrations from the tested sample are 0.565 ($mg/m^3$) at (0 day), 0.880 ($1^{st}$ day), 0.988 ($3^{rd}$ day), 0.231 ($4^{th}$ day), and 0.655 ($10^{th}$ day). This frac sand also used the background solution of Table 3 and is shown as the Example 5 curve of FIG. 7. Example 5 uses the prior coating solution and the procedure of Example 4. The results show how increase of the temperature adversely affects the dust concentration of the coated proppant.

Example 7

In this example, 100 Mesh frac sand from Unimin's frac sand plant was coated with the new dust suppression solution originally described in Example 3. This embodiment of the invention used a dosage level of 0.84 (mL/lbs.) by employing the general spraying procedure described in Example 4 at room temperature (about 19° C.). The measured overall average dust concentrations from the tested sample of this proppant are 0.019 ($mg/m^3$) at (0 day), 0.044 ($1^{st}$ day), 0.036 (4th day), 0.202 (8th day), and 0.203 ($14^{th}$ day). By merely adding a small amount of surfactant as indicated in Table 4, generically defined in Table 1, to the unsuccessful background solution, like Table 3, the frac sand was converted to a frac sand meeting the desired, sought after dust control limits. It is by definition a "long term dust free" proppant. The results of this improvement are compared to frac sand processed by the background solution of Examples 4 and 5. The improved long term dust free frac sand is Example 7 in FIG. 7.

Figure 7:
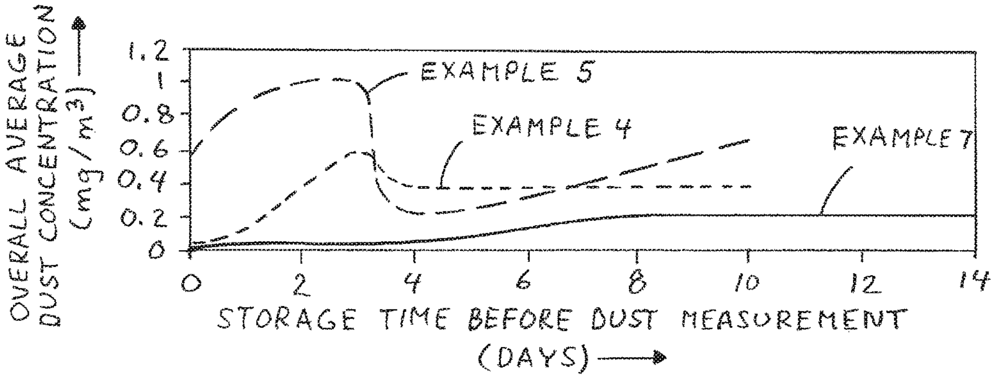

In summary, the advantage of the chemically treated frac sand in Example 7 over other examples using any background solution of cationic polymers is illustrated in FIG. 7. A small amount of surfactant was introduced in the prior recipe to produce Example 7. The new solution is shown in Table 4. Potentially, the strong interaction among the surfactant (in this example anionic), cationic polymers, electrolyte of sodium chloride, and water are believed to play key roles in inhibiting and maintaining the dust free of products for over desirable 4 day periods. Examples above disclose the advances made by Unimin in field of dust free frac sand.

Comparison Examples

An explanation of this disclosure is presented in further examples comparing proppants using the new solution and the background solution or merely using water as the dust control solution.

Example 8

In the water only example, 16 lbs of 100 Mesh frac sand from Unimin's Roff Oklahoma plant were coated with Di-water only by using spraying procedures as described in Example 4 with an application dosage level of Di-water of 0.8 mL/lbs at room temperature. The measured overall average dust concentrations of the samples with different storage time were as follows: 0.0588 ($mg/m^3$) (0 day), 0.069 ($1^{st}$ day), 0.159 ($3^{rd}$ day), 0.253 ($7^{th}$ day), 0.489 ($13^{th}$ day). Merely using water provided a frac sand labeled Example 8 in FIG. 8.

Example 9

In the next example, 100 Mesh frac sand from Unimin's plant was first heated at 105° C. overnight for 24 hr. and then, coated with dust suppression solution originally from Table 3 recipe at a dosage level of 0.8 (mL/lbs) by using spraying procedure described in Example 4. The tested samples were chemically treated two times by passing the same spraying chamber with the same dosage level each time before the samples were sealed in the plastic buckets for measuring the dust concentration of tested materials. The measured overall average dust concentrations from the tested sample are 0.4222 ($mg/m^3$) at (0 day), 0.180 ($1^{st}$ day), 0.18 ($3^{rd}$ day), 0.45 (7th day), and 0.244 ($13^{th}$ day). This frac sand is shown as Example 9 in FIG. 8.

Example 10

For the comparison example using the present invention, 100 Mesh frac sand from Unimin's frac sand plant was coated with dust suppression solution at a reduced dosage level of 0.40 (mL/lbs) by using spraying procedure described in Example 4 at room temperature (about 19° C.). The dust suppression concentration of solution similar to Table 4 as used in Example 7, however, the solution concentration of Example 10 was raised from 0.893 percent by weight to 2.217%. The recipe for preparing the above chemical solution is listed in Table 5 and is shown as Example 10 in FIG. 8.

TABLE 5

Dust Suppression Solutions Used for Treating Frac Sands (example 10)

| | Raw Material Components | Wt % | Wt % | Solution Conc. (%) | Solid % | Quantities (gram) |
|---|---|---|---|---|---|---|
| 1 | Di-water | Di-water | 94.631 | | | 946.3 |
| 2 | NaCl (Morton Salts) | NaCl (Morton Salts) | 0.250 | | 0.25 | 2.5 |
| 3 | Floquat FL 4135 | Floquat FL 4135 | 2.780 | 35 | 0.973 | 27.8 |
| 4 | Floquat FL 4440 | Floquat FL 4440 | 2.320 | 42 | 0.974 | 23.2 |
| 5 | Tergitol NP-7 | Tergitol NP-7 | 0.019 | | 0.02 | 0.2 |
| | Total: | | 100 | | 2.217 | 1000.0 |

The measured overall average dust concentrations from the tested sample are 0.0284 ($mg/m^3$) at (0 day), 0.0147 ($1^{st}$ day), 0.0239 ($4^{th}$ day), 0.108 ($8^{th}$ day), and 0.1576 ($14^{th}$ day). The frac sand meets all requirements defining dust free frac sand sought by the proppant industry.

Figure 8:
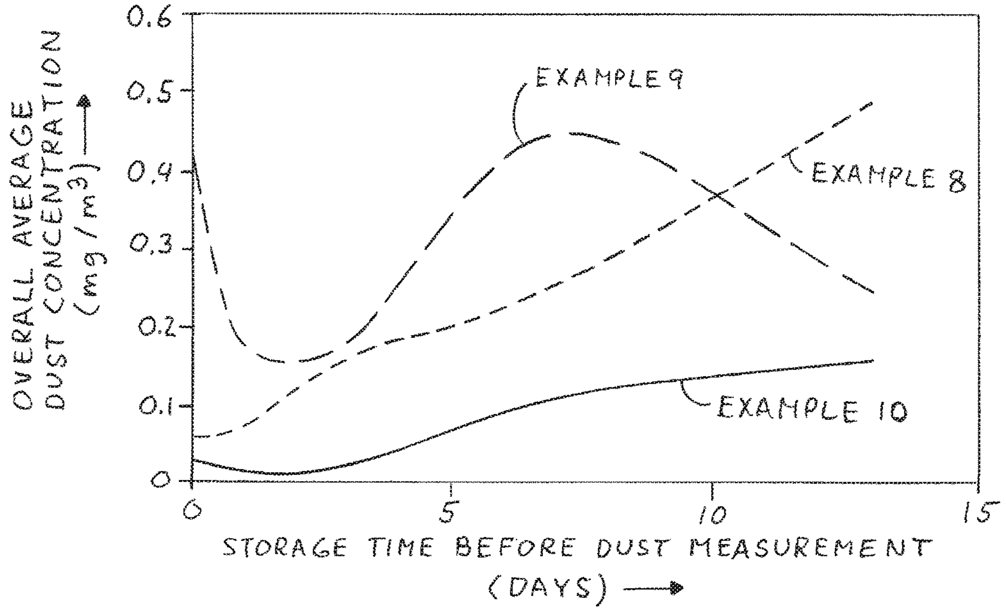

Examples of 8, 9, and 10 demonstrate in FIG. 8 that the discovered recipe for Example 10 (Table 5) will effectively inhibit the treated frac sand dust concentration for at least 4 days with a dust concentration less than 0.05 ($mg/m^3$) measured by pDR. In contrast, chemical solutions from Examples 8 (water only) and 9 (background) were not able to do so. Example 10 used a solution which is an embodiment of the solution forming the invention and disclosed in Table 1.

Further Example

Example 11

After the development shown in FIGS. 7 and 8, another example was made where 16 (lbs) of 100 mesh frac sand from Unimin's frac sand plant was pre-heated in oven overnight for 24 hr. at oven temperature of 60° C. Then, the oven-dried sand was coated with spraying operation by method 200 at a targeted dosage level of 0.60 (mL/lbs) three times before sealed in 5 gallon plastic buckets for later usage. The actual dosage level calculated for spraying trial was 0.674, 0.681, and 0.725 (mL/lbs). The solution recipe used for this Example 11 is shown below.

Example 11 (Composition)

| RunOrder | Components | Wt % % | Concentration % | % solid % | Quantities (gram) |
|---|---|---|---|---|---|
| 1 | Di-Water | 1.578 | | | 240.16 |
| 2 | NaCl (Morton Salt) | 0.240 | 100 | 0.240 | 36.53 |
| 3 | Tergitol L-61 | 0.010 | 100 | 0.010 | 1.52 |
| 4 | Floquat FL 4135 | 2.770 | 35 | 0.970 | 421.61 |
| 5 | Floquat FL 4440 | 2.310 | 42 | 0.970 | 351.60 |
| 6 | Di-water | 93.092 | | | 14169.22 |
| | Total: | 100.00 | | 2.190 | 15220.64 |
| | At a dosage level of 0.9 mL/lbs, | | | | |
| | Needed treating chemicals: | | | | |
| | Density of the treating solution: | | | | |
| | Wt. of the treating chemicals: | | | | |
| | Total wt. by lbs unit: | | | | |
| | Gallon: | 3.79 | | | |
| | 4 gallon: | 15160 | ( mL) | | |

The procedure for preparing this chemical solution is as follows: a) weigh (1) into a 100 mL beaker, then, weigh (2) and then, charge it into the 100 mL beaker; b) weigh floquat FL 4135 and Floquat FL 4440 in a 100 mL beaker, then, charge both (2) and (3) into mixed components; c) weigh (4) with a 50 mL glass beaker and add the Tergitol NP-7 into (b); d) blend the above mixture of (c) with a stirring bar at a fixed RPM for 2-5 (min.); e) weigh (6) into a 1000 mL beaker and rinse the 100 mL beakers containing the leftover of Floquat FL 4135 and Floquat FL 4440 and 50 mL beaker containing surfactant; f) add leftover water of (e) into the $1^{st}$ 1000 mL beaker that contains all solution chemicals; g). Transfer the solution into a separated container and label the solution as standard dust suppression chemicals. Procedure for treating frac sand chemically is described in Example 4. The overall average dust concentration was measured as follows: 0.03 (mg/$m^3$) (0 day); 0.022 ($4^{th}$, day), 0.05 ($8^{th}$, day). Consequently, the procedure accomplishes the desired long term dust control of the proppant, i.e. frac sand.

As established by the new proppant examples, especially Example 11, the development defined in this specification produces a proppant having particles coated with a dust suppression solution, preferably by spray coating, which treated proppant has an average dust concentration of less than 0.05 milligrams per cubic meter, and preferably less than 0.03 milligrams per cubic meter, for at least 4 days and a moisture content of less than 0.30 percent by weight. In practice, this dust free proppant is created by using a dust suppression solution including two cationic polymers and a small amount of an anionic surfactant. With cationic polymers, a non-ionic surfactant has also been used.

Figure 5:
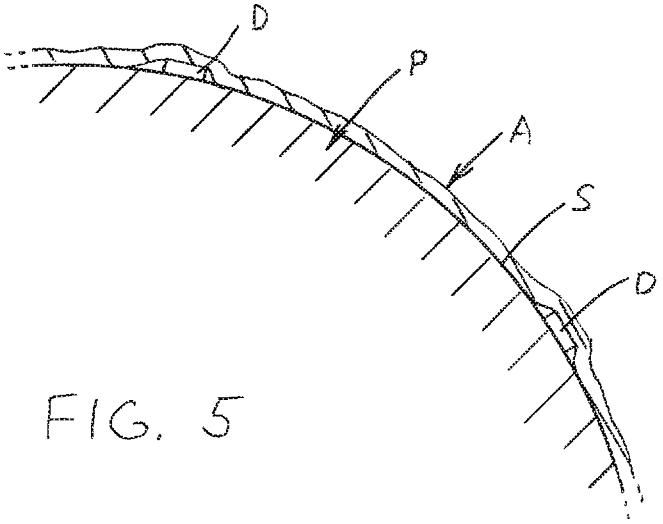
FIG. 5 is a partial view of a particle coated with the novel solution of the invention.
Figure 6:
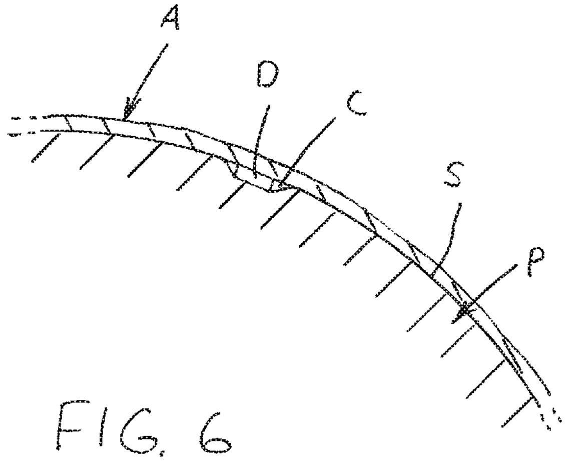
FIG. 6 is a schematic view similar to FIG. 5 disclosing the dust particles migrating into the pockets or channels of the coated particles; and, FIGS. 7 and 8 are graphs showing a comparison of a background solution and such solution modified by the invention to illustrate the advantages of the present invention when the novel solution is coated onto particles as described in FIGS. 1-4.

Frac sand grains from Example 1 and Example 11 were placed under a scanning electronic microscopy (SEM)/EDS, manufactured in Japan with brand name of Hitachi S-3400N, to make observation on how the dust particles were distributed on the surfaces of frac sand grains. The results for Example 11 are shown in FIGS. 5 and 6 where frac sand particle P is coated over its surface with novel solution A covering most, if not all, of the exposed surface. The dust particles D like other "fines" are distributed on surface S as schematically shown in FIG. 5. Chemically treated particles P tend to allow dust particles D to migrate themselves into pockets or channel C as schematically shown in FIG. 6. The dust particles are randomly distributed into the recesses of particles P. Such random distribution is due to the reduced surface tension of the coated frac sand particle surfaces. Van Der Waals interaction is between dust and the frac sand surface. Ionic interaction occurs between the multi-component systems. In summary, coating solution A covers the particle surfaces and captures dust particles and fines by the increased surface tension created by the use of the "small amount" of surfactant in solution A.

Comparison of Example 1 (free flowing frac sand) with Example 11 was made per API Test Standard, to determine whether the chemical treatment will alternate the frac sand performance. The untreated frac sand of Example 1 and the treated frac sand of Example 11 were submitted to test on the following performance parameters per API standard: Loss on ignition (LOI), acid solubility (56), roundness, turbidity, crush fines % at 7000 (PSI) closure stress, bulk density per ISO. The results of the tested comparison are listed in Table 6.

TABLE 6

Comparison of Selected Products Performance Parameters between Neat vs. Chemically Treated Frac Sands

| NoteBook ID | Description | LOI (%) | Acid Solubility (%) | Roundness 0.6 | Sphericity | Turbidity (FTU) | Crush fines @ 7k (psi) | Bulk Density (g/cc) |
|---|---|---|---|---|---|---|---|---|
| 197-9-1 | Example 1 | 0.075 | 2.02 | 0.7 | 0.6 | 21 | 6.5 | 1.476 |
| 197-9-3 | Example 11 | 0.079 | 1.99 | 0.7 | 0.6 | 7 | 5.3 | 1.492 |

Evidently, the chemically treated frac sand (Example 11) based upon the Table 6 seemed to have less crush fines % at 7000 (psi) closure stress. Also, frac sand from Example 11 is less turbid than that from the untreated frac sand of Example 1.

Comparison of Flow Characteristics Among Examples 1, 4, and 11

Flow characteristics is one of important performance parameters for granular materials. In general, un-treated frac sand (Example 1) constitutes flowable granular materials that are defined as "free flow" granular materials. It has a flow index no more than 0.10 measured by a flow meter. More often, as the frac sand materials are treated with chemical solution, the materials tend to become clumpy and coagulated. During storage and transportation, the coated materials will create arching and caking in silo and hard to pump from shipping truck, railcar. In the hydraulic fracing well job site, the materials will tend to have difficulty to transfer one station to the next station. Flow test showed that the selected chemically treated frac sand samples from Examples 4 and 11 flow as well as Example 1. Both of their flow index is less than 0.1% after the added coatings.

Features of Invention

In summary, the several examples demonstrate the coating technology developed in this invention has the following advantages.

The coatings can effectively suppress the overall average dust concentration of treated frac sand under dust concentration less than 0.10 (mg/m$^3$) or more specially no more than 0.05 (mg/m$^3$) measured by pDR monitoring system without creating or involving issues of flowing during material transportation and application in the hydraulic fracing job site. It is "dust free".

The coated proppant will retain its dust suppression efficiency for at least 4 days. It is "long term dust free".

The dosage level of the coatings will be less than 10 (mL/lbs). More preferred less than 2.5 (mL/lbs), 1.5, 1.0, 0.9, 0.8, 0.6, 0.7, 0.5 mL/lbs.

The solid content of the coatings will be less than 5%. More preferred less than 3.0%, 2.25%, 2.0%, 1.5%, 1.0%, 0.5%, 0.2%.

The coatings can be added to the frac sand with a blender or mixer as in method 300. Alternatively, the dust suppression coating can be sprayed in any steps or processes during proppant manufacturing as in methods 100 and 200.

The solution chemicals can be coated at room temperature or in natural environments, but room temperature is preferred. Alternatively, the sand can be pre-heated to accelerate the moisture evaporation during the coating operation. However, the processing temperature should be less than 60 degrees Centigrade to prevent reduction of the water percentage.

The coated proppant has less fine migration and less fines percentage under tested closure stress per API test standard.

The new solution for particle coating in the illustrated examples is comprised of simple components that are available in the open market, which in the preferred embodiment comprises water and water soluble polymers such as: cationic polymers with long chain length (Floquat FL 4440 from SNF); cationic polymers with short chain length (Floquat FL 3145); electrolytes such as sodium chloride or potassium chloride; and, an added small amount of a surfactant, preferably anionic and for cationic polymers, but also nonionic, ionic, cationic, amphoteric, etc. in very small amounts. Typical surfactants used include Tergitol NP-7 (anionic) and L-61 (nonionic) from DOW chemicals and Fluronic L-61 (nonionic) from BASF.

A small amount of surfactant causes the solution to evenly spread over the particle surfaces and enhance the coating. Especially when applied as an air mist.

ADVANTAGES

The novel proppant is "dust free" and "free flowing" because the water is attached to and spread over the particle surfaces by action of the small amount of surfactant. Thus, the water covering the particles and holding the polymers remains physically active for a prolonged time, i.e. at least 4 days. The "water" layer on the sand never exceeds a moisture content greater than 0.30 percent for the proppant itself and preferably less than 0.10 percent. Consequently, a reduction in moisture, such as by drying, is not needed. Such drying causes agglomeration which is not wanted at the drill head. By a low moisture content, the proppant remains "free flowing". The air used in applying the solution in preferred methods 100 and 200 does not allow 'globs" of or "droplets" of water to be distributed independently and separately over the surface of the proppant particles. By the air mist, the new solution is evenly applied and spread over a large percent of the particle surfaces so the surfactant action remains very beneficial over several days.

The proppant remains "dust free" by retention of the water solution and is "free flowing" because the water is so evenly distributed and has its action controlled by the surfactant. In summary, a dust suppression solution to be sprayed onto a mass of proppant particles without really converting the proppant to "long term" dust free condition is modified to convert the proppant to a true long term dust free condition.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

It is claimed:

1. A long term dust free proppant comprising inorganic granular particles with surfaces spray coated at ambient temperature by an air mist with a water soluble dust suppression solution which is attached to and spread over said surfaces of said particles, said dust suppression solution comprising 0.80 milliliters per pound of said proppant and has at least 90 percent by weight water, 0.10 to 6.0 percent by weight of water soluble polymer and a small amount of surfactant constituting less than 0.5 percent by weight of said solution, wherein said dust suppression solution comprises less than 10 milliliter per pound of said proppant and where the amount of solution added to the proppant is an amount resulting in a moisture content of said proppant of less than 0.30 percent by weight so said long term dust free proppant is also free flowing.

2. A long term dust free proppant as defined in claim 1 wherein said inorganic granular particles are formed from a mineral selected from the class comprising frac sand and bauxite.

3. A long term dust free proppant as defined in claim 1 wherein said dust suppression solution includes two water soluble polymers.

4. A long term dust free proppant as defined in claim 1 wherein the average dust concentration is less than 0.05 $mg/m^3$ for at least 4 days.

5. A long term dust free proppant as defined in claim 1 said ambient temperature is in the range of 5-30 degrees Centigrade.

6. A long term dust free proppant as defined in claim 1 having an average dust concentration of less than 0.03 $mg/m^3$ for at least 4 days and containing two cationic polymers.

7. A long term dust free proppant as defined in claim 6 wherein said surfactant is an anionic surfactant.

* * * * *